(12) United States Patent
Hamza et al.

(10) Patent No.: US 8,260,036 B2
(45) Date of Patent: Sep. 4, 2012

(54) OBJECT DETECTION USING COOPERATIVE SENSORS AND VIDEO TRIANGULATION

(75) Inventors: Rida M. Hamza, Maple Grove, MN (US); Robert A. Blaser, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1053 days.

(21) Appl. No.: 11/746,134

(22) Filed: May 9, 2007

(65) Prior Publication Data
US 2008/0279421 A1    Nov. 13, 2008

(51) Int. Cl.
G06K 9/00 (2006.01)
(52) U.S. Cl. ...................................................... 382/154
(58) Field of Classification Search ............................ None
See application file for complete search history.

(56) References Cited

U.S. PATENT DOCUMENTS

| | | | | |
|---|---|---|---|---|
| 6,061,068 | A * | 5/2000 | Hoffman et al. ............... | 345/619 |
| 6,157,876 | A * | 12/2000 | Tarleton, Jr. et al. ........... | 701/16 |
| 7,460,951 | B2 * | 12/2008 | Altan et al. .................... | 701/207 |
| 7,706,963 | B2 * | 4/2010 | Parikh et al. ................... | 701/117 |
| 7,920,959 | B1 * | 4/2011 | Williams ........................ | 701/117 |
| 2003/0215141 | A1 * | 11/2003 | Zakrzewski et al. .......... | 382/190 |
| 2004/0012516 | A1 * | 1/2004 | Schiffmann et al. ............ | 342/70 |
| 2004/0034465 | A1 * | 2/2004 | Spiesberger .................... | 701/200 |
| 2006/0008137 | A1 * | 1/2006 | Nagahdaripour et al. .... | 382/154 |
| 2006/0072014 | A1 * | 4/2006 | Geng et al. ..................... | 348/159 |
| 2006/0244830 | A1 * | 11/2006 | Davenport et al. ............ | 348/148 |
| 2006/0293854 | A1 * | 12/2006 | Chiou et al. .................... | 701/301 |
| 2008/0063270 | A1 * | 3/2008 | McClelland et al. .......... | 382/170 |
| 2008/0279421 | A1 * | 11/2008 | Hamza et al. .................. | 382/103 |
| 2009/0224958 | A1 * | 9/2009 | Aphek et al. ..................... | 342/54 |
| 2010/0208941 | A1 * | 8/2010 | Broaddus et al. .............. | 382/103 |

FOREIGN PATENT DOCUMENTS
WO    WO 2007116403 A2 * 10/2007

OTHER PUBLICATIONS

Jai et al, "Vision based data fusion for autonomous vehicles target tracking using interacting multiple dynamic models," Computer Vision and Image Understanding, Dec. 23, 2006, pp. 1-21, vol. 109, No. 1, Elsevier Science Inc., New York.
Bhanu B et al, "Integrated binocular and motion stereo in a inertial navigation sensor-based mobile vehicle," Proceedings of the International Symposium on Intelligent Control, Aug. 11-13, 1992, pp. 60-65, IEEE, New York.
Armesto L et al, "Multi-rate fusion with vision and inertial sensors," Proceedings of the 2004 IEEE International Conference on Robotics and Automation, Apr. 26, 2005, pp. 193-199, IEEE, New York.

(Continued)

*Primary Examiner* — Bhavesh Mehta
*Assistant Examiner* — Tahmina Ansari
(74) *Attorney, Agent, or Firm* — Shumaker & Sieffert, P.A.

(57) ABSTRACT

Methods and apparatus are provided for detecting and tracking a target. Images are captured from a field of view by at least two cameras mounted on one or more platforms. These images are analyzed to identify landmarks with the images which can be used to track the targets position from frame to frame. The images are fused (merged) with information about the target or platform position from at least one sensor to detect and track the target. The targets position with respect to the position of the platform is displayed or the position of the platform relative to the target is displayed.

25 Claims, 4 Drawing Sheets

OTHER PUBLICATIONS

Bryson M et al, "Active Airborne Localisation and Exploration in Unknown Environments using Inertial SLAM," Proceedings of the 2006 IEEE Aerospace Conference, Mar. 4, 2006, IEEE, New York.

Lin Chai; Hoff W A; Vincent T, "Three-dimensional motion and structure estimation using inertial sensors and computer vision for augmented reality," Presence: Teleoperators and Virtual Environments, Oct. 2002, pp. 474-492, MIT Press, Cambridge.

Youngjin Hong et al, "Detecting and Tracking People by Mobile Robot Using Structured Light Range Sensor," Proceedings of the 2005 IEEE International Conference on Intelligent Robots and Systems, Aug. 2005, IEEE, New York.

Pages J et al, "A Camera-Projector System for Robot Positioning by Visual Servoing," Proceedings of the 2006 Conference on Computer Vision and Pattern Recognition Workshop, Jun. 2006, IEEE, New York.

Jaime Valls Miro et al, "Towards Vision Based Navigation in Large Indoor Environments," Proceedings of the 2006 IEE International Conference on Intelligent Robots and Systems, Oct. 2006, IEEE, New York.

International Search Report for 08155924.7 dated Jun. 23, 2009.

European Examination Report from corresponding EP Application 08155924.7, mailed Feb. 3, 2011, 6 pages.

Examination Report from corresponding EP Application No. 08155924.7, dated Aug. 27, 2009, 5 pages.

Reply to communication from the Examining Division, for EP Application No. 08155924.7, dated Mar. 4, 2010, 10 pages.

Reply to communication from the Examining Division, for EP Application No. 08155924.7, dated Jul. 18, 2011, 12 pages.

Chai, L.; Hoff, W.; Vincent, T.; 3-D Motion and Structure Estimation Using Inertial Sensors and Computer Vision for Augmented Reality, Oct. 2002.

Burt., P., et al., Enhanced Image Capture Through Fusion, IEEE, 0-8186-3870-2/93, pp. 173-182, 1993.

Summons to Attend Oral Proceedings, from counterpart EP Application No. 08155924, 16 pages, mailed May 10, 2012.

* cited by examiner

US 8,260,036 B2

OBJECT DETECTION USING COOPERATIVE SENSORS AND VIDEO TRIANGULATION

FIELD OF THE INVENTION

The present invention generally relates to detecting objects in space or terrestrially, and more particularly relates to detecting and tracking objects for the purpose of rendezvous (docking) or target avoidance.

BACKGROUND OF THE INVENTION

Accurate detection and tracking of target objects is essential to mission critical maneuvers such as rendezvous (docking) or target avoidance to prevent collision. Whether docking the space shuttle, avoiding air traffic or navigating streets in low light or adverse conditions, target detection and tracking can be essential to avoid damage to a vehicle or other platform or loss of life.

Accordingly, it is desirable to be able to detect and track the position of a target relative to the position of a moving platform. In addition, it is desirable to be able to detect and track the platform's position with respect to a target to be avoided. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for detecting and tracking a target. The apparatus comprises at least two camera mounted onto one or more moving platforms. Images from the cameras are fused (merged) with information about the target and/or the platform position from at least one other sensor. The fused information is process to triangulate the position of the target and track its position relative the moving platform or the position of the platforms with respect to the location of the target.

A method is provided for detecting and tracking a target. The method comprises capturing an image of a field of view from at least two cameras mounted on one or more platforms and identifying landmarks with the images. The images are merged to detect and track the target. The targets position as determined from the cameras is compared with information about the target and/or the platform from at least one sensor and then either the target location with respect to the position of the platform is displayed or the position of the platform relative to the target is displayed.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
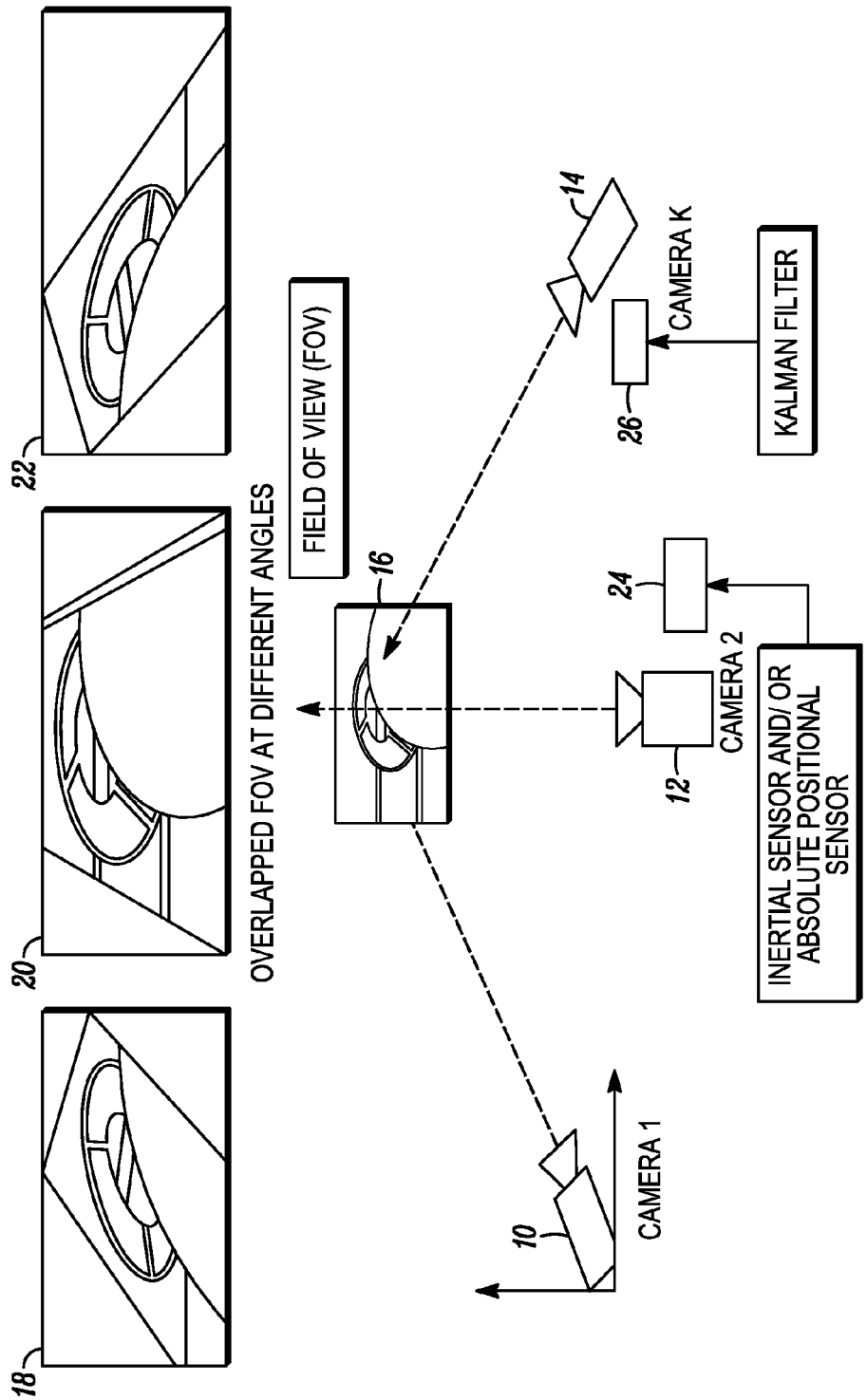
FIG. 1 is an illustration of video triangulation in accordance with one embodiment of the present invention.

FIG. 1 is an illustration useful to understand the basic premise of the present invention. At least two cameras (10, 12 and 14) are mounted to a moving platform (not shown). The platform could be a space shuttle, aircraft, land vehicle or water craft. The multiple cameras are set at different orientations to a field of view (FOV) 16 such that the cameras will capture images at different angles. Thus, when an image is taken of the field of view 16, Camera 1 (10) will capture image 18, Camera 2 (12) will capture image 20 and Camera k (14) will capture image 22. Each camera has integrated in it or is supplemented externally by an inertial sensor 24. The inertial sensor 24 could be a global positioning sensor (GPS), gyro system or it could be information from a synthetic vision system (SVS) which includes a database of templates or objects to be detected and tracked. However, while the GPS or SVS specific (inertial) sensor type are used in this exemplary embodiment, it should be appreciated that the present invention is not limited to use of sensor types that provide absolute and relative position and attitude information, sensors that provide acceleration, velocity, altitude and navigation information can also be used in the present invention.

The inertial sensors within or in cooperative operation with the cameras are used for initial calibration of the system and for fusing (merging) information about the camera position with information taken from the images captured by the cameras. At its most basic level, the fusing technique employed by the present invention comprises a double check of the position of the target, but more importantly, the fusing operation provides a figure of confidence or merit as to how accurately the target has been detected or is being tracked when the inertial information about the target is known a priori.

In the event of failure of the inertial sensor or if GPS signals are temporally lost (commonly referred to as "GPS denied" by those skilled in the art), a Kalman filter 26 can be used to predict the next platform position in an image given the history of information available to the Kalman filter. As is known by those skilled in the art, a Kalman filter is a technical approach to predict future values (in the case of the present invention the next position of the platform) given that a history of prior values is known.

According to one preferred embodiment of the present invention, the system is useful for rendezvous (docking) maneuvers where it is critical to know the position of the target relative to the position of the moving platform. In another preferred embodiment of the present invention, it is critical to know the position of the moving platform relative to the position of a target to be avoided. Both solutions are provided by the present invention.

Figure 2:
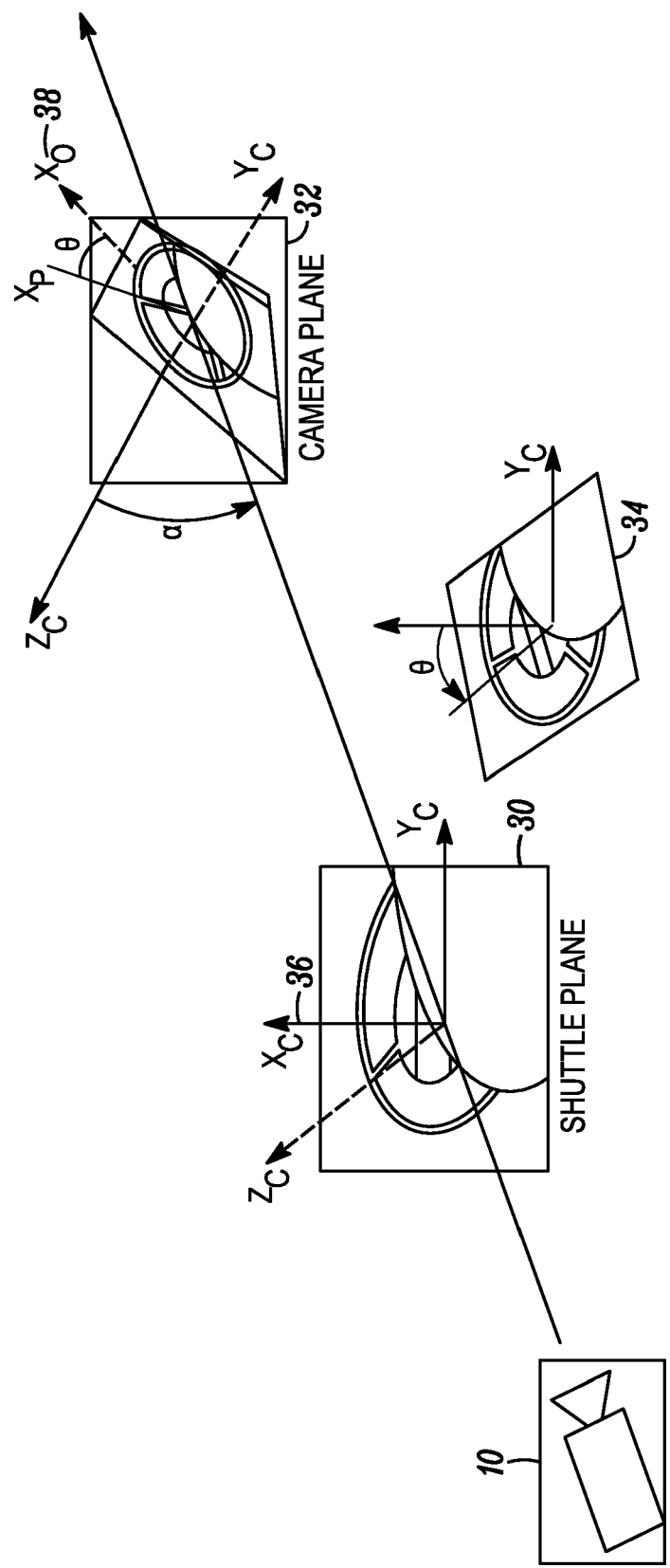
FIG. 2 is an illustration of one of the cameras of FIG. 1 demonstrating the perspective plane orientation in accordance with the present invention.

FIG. 2 illustrates the perspective plane orientation of a camera 10 on a moving platform (in this example a space shuttle). To determine the orientation in space of a planer surface of the space shuttle (the shuttle plane 30) individual images from the camera 10 (the camera plane 32) and the other cameras are triangulated. The visual triangulation of the field of view 34 is resolved according to the present invention by using the perspective plane approach as follows.

Constructing the imaging plane vector $x_c$ 36 as a function of the observed (by the cameras) target coordinates $x_o$ 38 (normal to the shuttle surface plane) results in:

$x_c = R_\beta T_\alpha R_\theta x_o$ where $\beta$ is the tilt angle, $\theta$ is the x-axis tilt vector and $\alpha$ is the elevation angle (sometimes referred to as the slant angle). Given that the perspective cameras' positions are known by initial calibration of the inertial sensors, the observation vector for each camera can be mapped into common coordinates resulting in: $x_{c1} = \lambda_1 R_\beta T_\alpha R_\theta x_{o1}$ where $\lambda$ defines a scaling parameter of a landmark (or feature) with an image to account for target displacement or ranging from the platform. In a similar manner, $x_{c2}$ and $x_{c3}$ can be computed.

Both orientation matrices of the tilt angles can be defined respectively as follows:

$$R_\beta = \begin{bmatrix} \cos\beta & -\sin\beta \\ -\sin\beta & \cos\beta \end{bmatrix}$$

$$R_\theta = \begin{bmatrix} \cos\theta & -\sin\theta \\ -\sin\theta & \cos\theta \end{bmatrix}$$

The transition matrix can be formulated as:

$$T_\alpha = \begin{bmatrix} \cos\alpha & 0 \\ 0 & 1 \end{bmatrix}$$

The equations $x_{c1}$, $x_{c2}$ and $x_{c3}$ can be reformulated into a discrete Kalman filter framework to solve $$\begin{cases} x_c(k+1) = f(k, x_c(k)) + g(k, x_c(k))\omega(k) \\ x_o(k) = h(x_c(k), k) + n(k) \end{cases}$$

After linearization of the model, we define $$H(k) = \left(\frac{\partial h}{\partial x}\right)$$

and $$F(k) = \left(\frac{\partial f}{\partial x}\right),$$

resulting in:

$$\begin{cases} \hat{x}_o(k+1/k+1) = \hat{x}_o\left(\frac{k+1}{k}\right) + K(k+1)\left[x_o(k+1) - H(k+1)\hat{x}_o\left(\frac{k+1}{k}\right)\right] \\ P\left(\frac{k+1}{k+1}\right) = [I - K(k+1)H(k+1)]P\left(\frac{k+1}{k}\right) \end{cases}$$

as the target measurement update question, and;

$$\begin{cases} \hat{x}_o\left(\frac{k+1}{k}\right) = F(k)\hat{x}_o(k/k) \\ K(k+1) = P\left(\frac{k+1}{k}\right)H^T(k+1)\left[H(k+1)P\left(\frac{k+1}{k}\right)H^T(k+1) + R(k+1)\right]^{-1} \end{cases}$$

as the time update equation.

With these equations, a target's updated (future) location at some updated (future) time can be predicted using a Kalman filter approach to assist in tracking the target's movement and providing displayed updated either relative to the moving platform position (docking) or the position of the platform relative to the target (avoidance).

Figure 3:
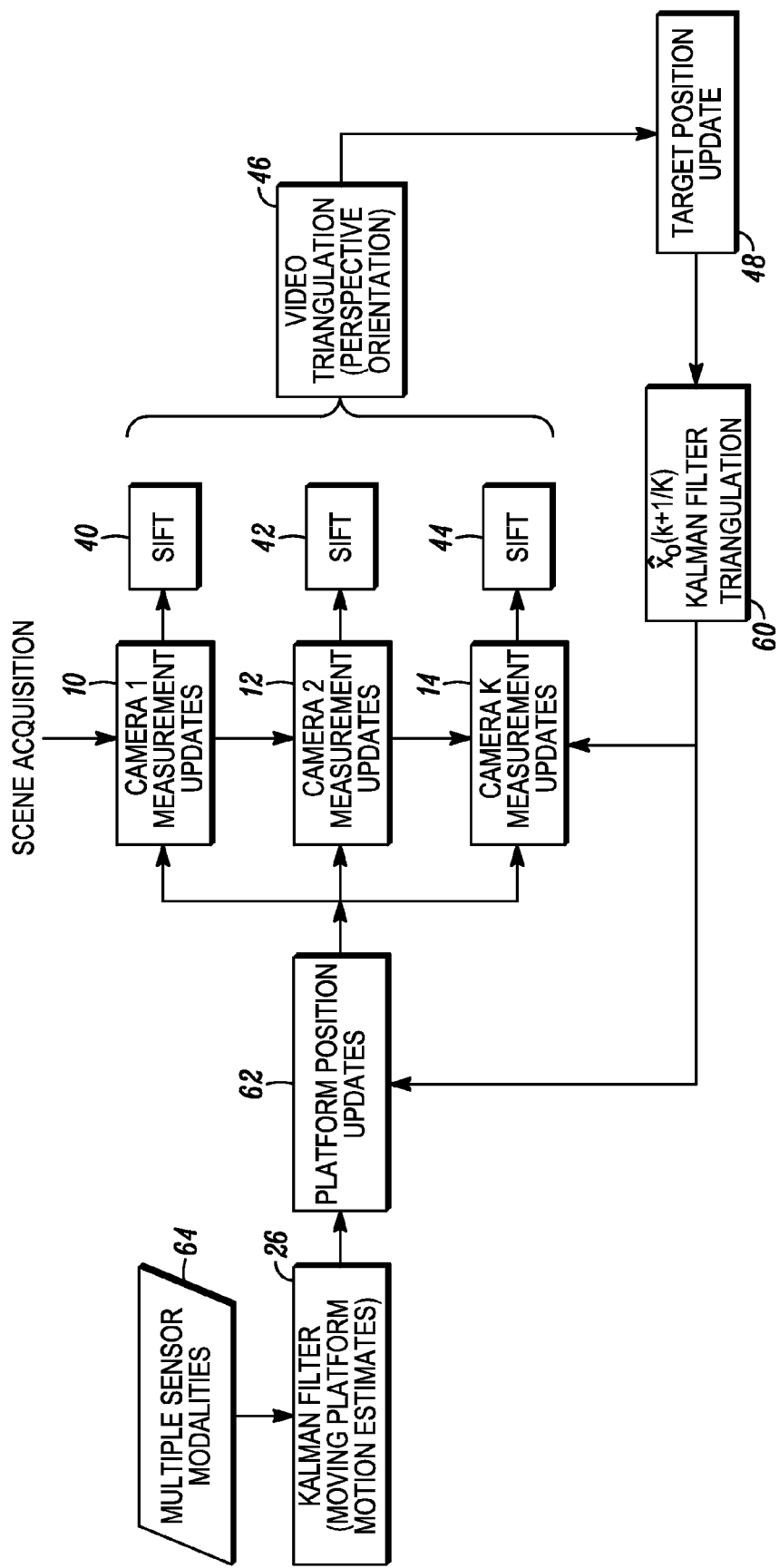
FIG. 3 is a block diagram of one embodiment of the present invention.

Referring now to FIG. 3, a block diagram of a system in accordance with the present invention is shown. Given that the Kalman filter equations have been resolved above, the Kalman filter 60 can provide target prediction information to be processed with scene acquisition imaging from the cameras 10, 12 and 14. The above equations for prespective orientation are formulated on the basis of a structure presence of an object. This information is processed using scale invariant features technologies (SIFT) 40, 42 and 44 which searches the camera images at the pixel level for landmarks (or features) within the images that can be used to track the target location frame to frame. Recall that the cameras have integrated in them or are working cooperatively with inertial sensors (e.g.; GPS, Gyro or SVS) and this information is fused (merged) while video triangulation processing 46 is performed to detect and track the target. The target position is then updated (displayed) 48 either relative to the moving platform location (docking) or the update could be displayed to show the moving platform location relative to the target (avoidance).

At each iteration, given a platform position, i.e. inertial readouts at each camera are used to define a reference coordinate, the SIFT blocks 40, 42, 44 are used to identify the target structure using raw features in the scene or using structured lighting in absence of physical structures to feed to the Video Triangulation 48. Using the perspective orientation, the target position is updated with respect to the moving platform. The targets relative position is predicted using the Kalman Filter 60; the moving platform position 62 is also updated via direct input from multiple inertial sensors 64; in case of sensor denial (e.g., GPS denial) predicted platform motion is achieved using a separate Kalman filter 26 to estimate a predicted next platform position. Now that an updated platform position and new inertial readouts for each camera are known, the process above reiterates (loops) to estimate the target position for obstacle avoidance.

For the docking application, a reverse process is utilized that begins with an estimate of the target position. The target position may be either read from a database or estimated using the Kalman filter triangulation process. The video triangulation process 46 can reconstruct the perspective orientation of the SIFT blocks 40, 42, 44 which process images captured by cameras 10, 12, 14 as discussed above. The platform position can then be estimated and the next pre-estimate position is updated in case inertial sensors are available, and if not available, the Kalman filter 26 can provide prediction information to the Kalman filter triangulation 60 to predict a pre-estimate of the target position. Using the new (for this iteration) target position estimate, the process reiterates to estimate the next platform position with respect to the target. The iteration (looping) is utilized in either application to provide an estimate of the target (avoidance) or the platform (docking) at all instances whether inertial sensing is denied or available and whether the targets has structured features or non structured features.

Those skilled in the art will appreciate that a vision based target acquisition and tracking system as provided by the present invention requires that the cameras be able to "see" (visualize) the field of view. In low (or no) light conditions some supplemental imaging assistance is needed. Accordingly, the present invention contemplates the use of structured lighting to illuminate the field of view (either continuously or in synchrony with the image capture timing). With structured lighting, a pattern is projected onto the field of view of each camera by an illumination source to create interference bands (the moiré effect). The interference pattern is highly sensitive to the relative motion between the two patterns caused by changes in the distance to the reflecting surface. The moiré phenomenon is highly effective in detecting targets in the path of the navigation (or surfaces of targets with limited structures that are desired to be tracked).

Figure 4A:
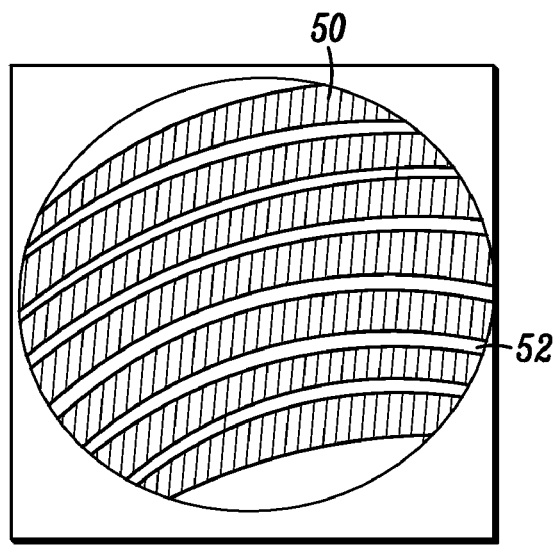
FIG. 4 is an illustration of structure lighting in accordance with one embodiment of the present invention.
Figure 4B:
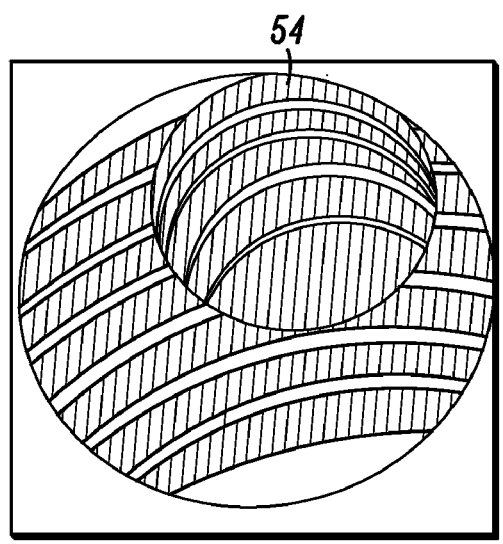

Referring now to FIG. 4A, an illustration of structured lighting according to the present invention is shown. An illumination source (not shown) projects an lighting pattern 50 onto a field of view 52. The cameras may now effectively capture images by detecting the interference patterns 54 shown in FIG. 4B.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:
    with at least two cameras mounted on one or more moving platforms at different perspectives, capturing an image of a field of view comprising a target;
    visually triangulating the field of view based on the images from the at least two cameras using a perspective plane approach, wherein visually triangulating the field of view comprises:
        determining a tilt angle, a tilt vector, and an elevation angle of each camera based on information from an inertial sensor;
        for each camera, constructing an imaging plane vector ($x_c$) equation set as a function of target coordinates of the target observed by the respective camera, and the tilt angle, the tilt vector, and the elevation angle of the camera;
        for each camera, solving the imaging plane vector ($x_c$) equation set to extract an observation vector ($x_0$); and
        mapping the observation vector ($x_0$) of each camera into common coordinates;
    determining a position of the target relative to a position of the one or more moving platforms based on the mapped observation vectors ($x_0$); and
    displaying the position of the target with respect to the position of the one or more platforms.

2. The method of claim 1, further comprising predicting a future position of the target prior to capturing a next image of the field of view.

3. The method of claim 2, wherein the predicting is performed via a Kalman filter and information from the inertial sensor.

4. The method of claim 1, wherein the inertial sensor comprises a plurality of inertial sensors, each inertial sensor being associated with a respective one of the cameras, the method further comprising, for each camera, initializing a camera position using the respective inertial sensor.

5. The method of claim 1, further comprising displaying the position of the one or more platforms with respect to the target.

6. The method of claim 1, further comprising illuminating the field of view with a structured light source prior to capturing the images.

7. The method of claim 6, wherein the structured light source produces a lighting pattern.

8. The method of claim 1, further comprising iterating an estimation of the position of the target and the position of the one or more platforms.

9. The method of claim 1, the method further comprising determining at least one of an absolute position, relative position, absolute attitude, relative attitude, acceleration, velocity, or attitude of the one or more platforms, or absolute navigation information or relative navigation information based on the inertial sensor, or determining synthetic vision information from a synthetic vision database.

10. The method of claim 9, further comprising processing information about the one or more platforms using a Kalman filter in the event of failure of the inertial sensor.

11. The method of claim 1, further comprising:
    for each camera, merging information about the camera from the inertial sensor with the image captured by the cameras; and
    checking the position of the target based on the merged information.

12. The method of claim 1, wherein mapping the observation vector ($x_0$) of each camera into common coordinates comprises mapping the observation vector ($x_0$) of each camera into common coordinates using a scaling parameter of a feature within the images captured by each of the cameras.

13. The method of claim 12, further comprising searching the images captured by the cameras for the feature using scale invariant features technologies.

14. A method comprising:
    with at least two cameras mounted on a moving platform at different perspectives, capturing an image of a field of view comprising a target;
    visually triangulating the field of view based on the images from the at least two cameras using the perspective plane approach, wherein visually triangulating the field of view comprises:
        determining the tilt angle, tilt vector, and elevation angle of each camera based on information from an inertial sensor;
        for each camera, constructing an imaging plane vector ($x_c$) equation set as a function of target coordinates of the target observed by the respective camera, and the tilt angle, the tilt vector, and the elevation angle of the camera;
        for each camera, solving the equation set to extract the observed object plane vector ($x_0$); and
        mapping the observation vector ($x_0$) of each camera into common coordinates;
    determining a position of the platform relative to a position of the target based on the mapped observation vectors; and
    displaying the position of the platform with respect to the position of the target.

15. The method of claim 14, further comprising predicting a future position of the platform using a Kalman filter.

16. A system comprising: P1 at least two cameras mounted on a moving platform, wherein the at least two cameras are each configured to capture an image of a field of view comprising a target;
    an inertial sensor;
    a processor configured to visually triangulate the field of view based on the images from the at least two cameras using a perspective plane approach, wherein the processor is configured to visually triangulate the field of view by at least;

determining a tilt angle, a tilt vector, and an elevation angle of each camera based on information from an inertial sensor, for each camera, constructing an imaging plane vector ($X_c$) equation set as a function of target coordinates of the target observed by the respective camera, and the tilt angle, the tilt vector, and the elevation angle of the camera, for each camera, solving the equation set to extract the observed object plane vector ($x_O$), and mapping the observation vector ($x_O$) of each camera into common coordinates, and wherein the processor is configured to determine a position of the target relative to a position of the moving platform based on the mapped observation vectors; and a display device configured to display the position of the target with respect to the position of the moving platform or the position of the moving platform with respect to the position of the target.

17. The system of claim 16, wherein the processor is configured to predict a future position of the target prior to the at least two cameras capturing a next image of the field of view.

18. The system of claim 17, wherein the processor is configured to predict a future position of the target using a Kalman filter.

19. The system of claim 16, wherein the inertial sensor comprises a plurality of inertial sensors, each inertial sensor being associated with a respective one of the cameras, wherein the processor is configured to initialize a camera position of each camera using the respective inertial sensor.

20. The system of claim 16, wherein the inertial sensor is configured to provide information indicative of at least one of an absolute position, relative position, absolute attitude, relative attitude, acceleration, velocity, or attitude of the platform, or absolute navigation information, relative navigation information, or synthetic vision information from a synthetic vision database.

21. The system of claim 20, further comprising a light source configured to illuminate the field of view with structured light prior to capturing the images.

22. The system of claim 21, wherein light source is configured to produce a lighting pattern.

23. The system of claim 16, wherein the processor is configured to predict a next position of the platform using a Kalman filter.

24. The system of claim 16, wherein the inertial sensor is configured to provide information indicative of at least one of an absolute position, relative position, absolute attitude, relative attitude, acceleration, velocity, or attitude of the moving platform, or absolute navigation information, relative navigation information, or synthetic vision information from a synthetic vision database.

25. The system of claim 16, wherein the processor is configured to map the observation vector ($x_O$) of each camera into common coordinates by at least mapping the observation vector ($x_O$) of each camera into common coordinates using a scaling parameter of a feature within the images captured by each of the cameras.

* * * * *